(12) United States Patent
Kim

(10) Patent No.: US 8,292,050 B2
(45) Date of Patent: Oct. 23, 2012

(54) ELECTRONIC MECHANICAL DRUM BRAKE

(75) Inventor: Joo Gon Kim, Gyeonggi-do (KR)

(73) Assignee: Mando Corporation, Gyeonggi-do (KR)

( * ) Notice: Subject to any disclaimer, the term of this patent is extended or adjusted under 35 U.S.C. 154(b) by 469 days.

(21) Appl. No.: 12/582,644

(22) Filed: Oct. 20, 2009

(65) Prior Publication Data

US 2010/0096224 A1 Apr. 22, 2010

(30) Foreign Application Priority Data

Oct. 21, 2008 (KR) .................. 10-2008-0102839

(51) Int. Cl.
*F16D 51/00* (2006.01)

(52) U.S. Cl. .............. 188/325; 188/79.51; 188/72.7

(58) Field of Classification Search ............. 188/79.51, 188/72.7, 72.8, 325, 326, 72.1, 74, 78, 71.7, 188/73.1, 71.1

See application file for complete search history.

(56) References Cited

U.S. PATENT DOCUMENTS 4,928,543 A * 5/1990 Johannesen et al. ......... 188/156

FOREIGN PATENT DOCUMENTS

| JP | 08-295210 | 1/1996 |
| JP | 2001-173693 A | 6/2001 |
| JP | 2006-336868 | 12/2006 |
| KR | 10-0682526 B1 | 2/2007 |

OTHER PUBLICATIONS

Chinese Office Action issued in Chinese Patent Application No. CN 200910246807.2 dated Jul. 6, 2011.

* cited by examiner

*Primary Examiner* — Melanie Torres Williams
(74) *Attorney, Agent, or Firm* — McDermott Will & Emery LLP

(57) ABSTRACT

Disclosed herein is an electronic mechanical drum brake. In the electronic mechanical drum brake including a drum rotated together with a wheel, a pair of brake shoes respectively including rims provided with linings, which rub against the inner circumferential surface of the drum and generate braking power, attached thereto and webs provided on the inner circumferential surfaces of the rims to reinforce rigidity of the rims, and an actuator provided between the webs of the pair of brake shoes, the actuator includes a screw shaft provided with a driven gear formed integrally therewith and a left-handed thread at one side thereof and a right-handed thread at the other side thereof, a driving motor to rotate the screw shaft in a regular direction and its reverse direction, a booster unit to increase rotary force of the driving motor and then to transmit the increased rotary force to the driven gear, and nuts screw-connected to both ends of the screw shaft and fixed to the webs. Thereby, the electronic mechanical drum brake has a large braking power and improved space efficiency.

9 Claims, 5 Drawing Sheets

ELECTRONIC MECHANICAL DRUM BRAKE

CROSS-REFERENCE TO RELATED APPLICATION

This application claims the benefit of Korean Patent Application No. 2008-0102839, filed on Oct. 21, 2008 in the Korean Intellectual Property Office, the disclosure of which is incorporated herein by reference.

BACKGROUND

1. Field

Embodiments of the present invention relate to an electronic mechanical drum brake with an electronic mechanical braking apparatus, which generates braking power using a motor.

2. Description of the Related Art

In general, brakes mounted in vehicles serve to decelerate or stop a vehicle during driving or maintain a stopped state of the vehicle, and perform a braking action by changing kinematic energy of the vehicle during driving into heat energy using a mechanical friction device.

These brakes are generally divided into drum brakes and disc brakes, and perform a braking action by an oil pressure.

Recently, an electronic mechanical braking apparatus, which performs a braking action by obtaining a braking power from a motor instead of the oil pressure, has been disclosed. The electronic mechanical braking apparatus performs the braking action by changing a rotary motion obtained by a motor into a rectilinear motion to push brake pads and then pressurizing the brake pads using the rectilinear motion.

Since it is difficult to obtain a large braking power from such a braking apparatus using the motor under power of 12V, a braking apparatus having a wedge structure to obtain a large braking power has been developed.

Such a braking apparatus having the wedge structure requires an additional driving device, such as a motor, in order to compensate for pad abrasion.

That is, in order to perform a braking function, the braking apparatus having the wedge structure requires the driving device to compensate for pad abrasion, thus increasing the number of necessary parts and raising manufacturing costs.

SUMMARY

Therefore, it is one aspect of the present invention to provide an electronic mechanical drum brake, which performs braking using one motor through a simple mechanical configuration, generates a large braking power, and improves space efficiency.

Additional aspects of the invention will be set forth in part in the description which follows and, in part, will be obvious from the description, or may be learned by practice of the invention.

In accordance with one aspect of the present invention, an electronic mechanical drum brake includes a drum rotated together with a wheel, a pair of brake shoes respectively including rims provided with linings, which rub against the inner circumferential surface of the drum and generate braking power, attached thereto and webs provided on the inner circumferential surfaces of the rims to reinforce rigidity of the rims, and an actuator provided between the webs of the pair of brake shoes, wherein the actuator includes a screw shaft provided with a driven gear formed integrally therewith and a left-handed thread at one side thereof and a right-handed thread at the other side thereof, a driving motor to rotate the screw shaft in a regular direction and its reverse direction, a booster unit to increase rotary force of the driving motor and then to transmit the increased rotary force to the driven gear, and nuts screw-connected to both ends of the screw shaft and fixed to the webs, and the nuts rectilinearly move along the screw shaft in opposite directions according to rotation of the driving motor, and thus cause the webs connected with the nuts to apply pressure to the pair of brake shoes or release the pressure from the pair of brake shoes so as to perform braking.

The booster unit may be a planetary gear device to increase the rotary force of the driving motor and then to transmit the increased rotary force to the driven gear.

The planetary gear device may include a sun gear connected to a rotary shaft of the driving motor, a plurality of planetary gears contacting the outer surface of the sun gear, a ring gear, the inner surface of which contacts the plurality of planetary gears, a carrier connecting the plurality of planetary gears, and a driving gear connected integrally with the carrier.

A connection gear unit to increase rotary force of the driving gear may be provided between the planetary gear device and the driven gear.

The driven gear may be one-sided on the screw shaft.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
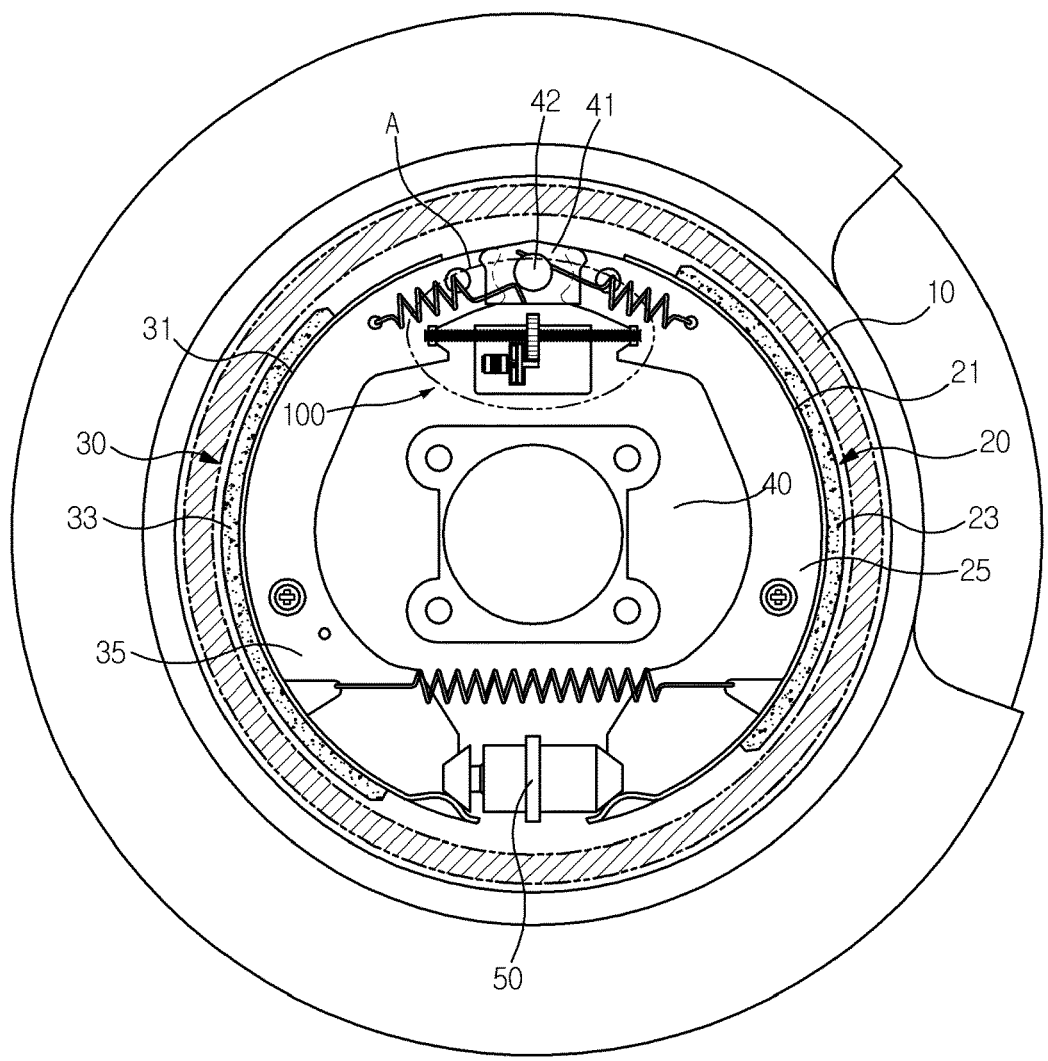
FIG. 1 is a cross-sectional view illustrating a schematic structure of an electronic mechanical drum brake in accordance with one embodiment of the present invention.

Reference will now be made in detail to the embodiments of the present invention, examples of which are illustrated in the accompanying drawings, wherein like reference numerals refer to like elements throughout.

Figure 2:
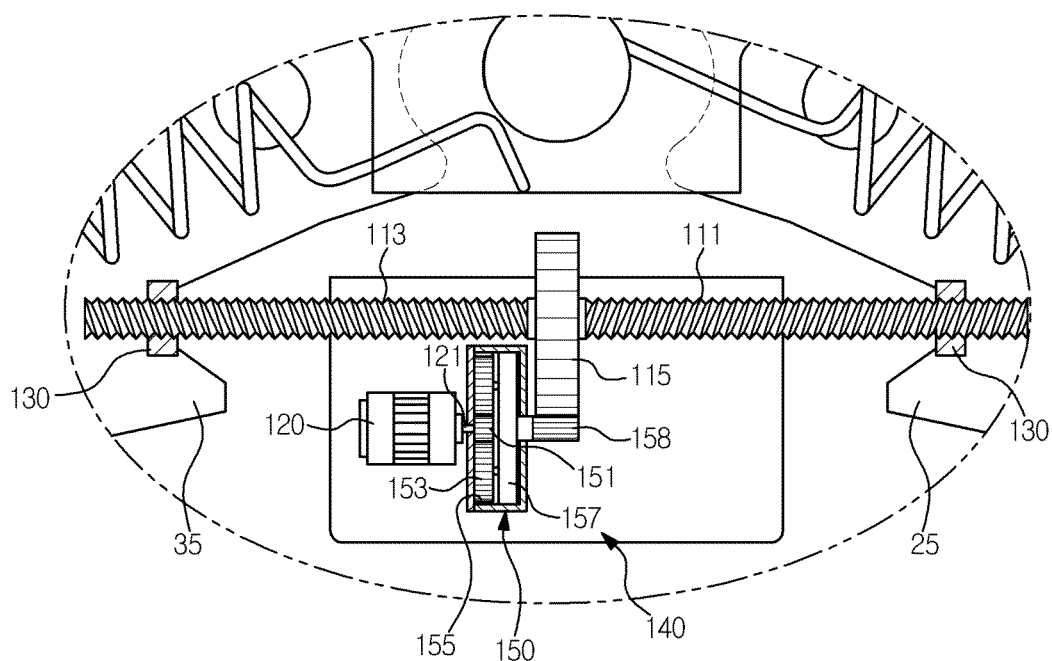
FIG. 2 is an enlarged view of a portion A of FIG. 1.

FIG. 1 is a cross-sectional view illustrating a schematic structure of an electronic mechanical drum brake in accordance with one embodiment of the present invention, and FIG. 2 is an enlarged view of a portion A of FIG. 1.

The electronic mechanical drum brake in accordance with this embodiment includes, as shown in FIG. 1, a drum 10 rotated together with a wheel (not shown), and a pair of brake shoes 20 and 30 having a semicircular shape and installed at both sides of the inner surface of the drum 10.

The two brake shoes 20 and 30 are mounted on a back plate 40 connected to a knuckle part (not shown) of a frame of a vehicle such that the brake shoes 20 and 30 are externally operatable, and are closely adhered to the inner circumferential surface of the drum, thus generating braking power.

Further, the brake shoes 20 and 30 respectively include rims 21 and 31 having a semicircular shape provided with linings 23 and 33, which rub against the inner circumferential surface of the drum 10 and generate braking power, attached to the outer circumferential surfaces of the rims 21 and 31, and webs 25 and 35 provided on the inner circumferential surfaces of the rims 21 and 31 to reinforce rigidity of the rims 21 and 31.

A support plate 41 to support the two brake shoes 20 and 30 movably and an anchor pin 42 to fix the support plate 41 are installed on the back plate 40 at the upper parts of the two brake shoes 20 and 30.

A clearance adjustment device 50, which causes the lower ends of the webs 25 and 35 of the two brake shoes 20 and 30 to be mutually supported by each other and adjusts a clearance between the inner surface of the drum 10 and the both brake shoes 20 and 30 through length adjustment, is installed at the lower parts of the two brake shoes 20 and 30.

Further, an actuator 100, which pushes the brake shoes 20 and 30 toward the inner surface of the drum 10 and thus produces friction between the linings 23 and 33 and the inner surface of the drum 10 so as to generate braking power, is provided between the upper ends of the webs 25 and 35 of the two brake shoes 20 and 30.

With reference to FIG. 2, the actuator 100 includes a screw shaft 11 provided with a driven gear 115 formed integrally therewith and a left-handed thread 111 at one side thereof and a right-handed thread 113 at the other side thereof, a driving motor 120 to rotate the screw shaft 111 in a regular direction and its reverse direction, nuts 130 screw-connected to both ends of the screw shaft 11 and respectively fixed to the webs 25 and 35 of the two brake shoes 20 and 30, and a booster unit 140 to increase driving power generated from the driving motor 120 and then transmit the increased driving power to the screw shaft 110.

A braking apparatus for vehicles generally uses power of 12 V, and thus has difficulty in exerting a large braking power. Therefore, in this embodiment, the booster unit 140 to increase the driving power generated from the driving motor 120 is provided.

The booster unit 140 includes a planetary gear device 150 to increase the rotary force of the driving motor 120 and transmit the increased force to the driven gear 115 rotated together with the screw shaft 110.

The planetary gear device 150 includes a sun gear 151, a plurality of planetary gears 153 contacting the outer surface of the sun gear 151, a ring gear 155, the inner surface of which contacts the plurality of planetary gears 153, and a carrier 157 connecting the plurality of planetary gears 153.

In order to increase a boosting force ratio, a plurality of the planetary gear devices 150 may be installed.

The sun gear 151 of the planetary gear device 150 is fixed to a rotary shaft 121 of the driving motor 120 and is rotated together with the rotary shaft 121, and a driving gear 158 is fixed to the central portion of the carrier 157 and is rotated together with the carrier 157.

The driven gear 115 connected integrally with the screw shaft 110 is configured to be engaged with the driving gear 158 provided at the central portion of the carrier 157 and thus to be rotated.

Figure 3:
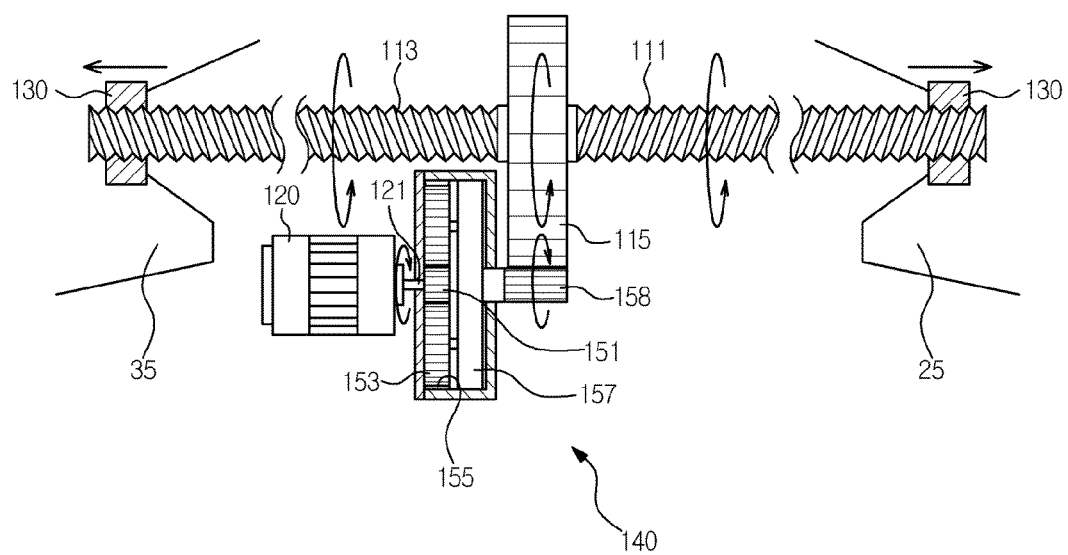
FIG. 3 is a view illustrating an operating state of the electronic mechanical drum brake in accordance with the embodiment of the present invention.

Thereby, as shown in FIG. 3, as the driving motor 120 is rotated in the regular direction, the sun gear 151 connected to the rotary shaft 121 of the driving motor 120 is rotated together with the rotary shaft 121.

Then, as the sun gear 151 is rotated, the plurality of planetary gears 153 contacting the outer surface of the sun gear 141 is rotated while revolving around the sun gear 141, and the carrier 157 connected to the plurality of planetary gears 153 is also rotated.

Therefore, the rotary force of the driving motor 120 is first increased at a planetary gear ratio by the planetary gear device 150, and is output through the carrier 157 under the condition that the rotating speed of the driving motor 120 is first reduced at the planetary gear ratio.

Further, as the driving gear 158 connected integrally with the carrier 157 is rotated by the rotation of the carrier 157, the driven gear 115 engaged with the driving gear 158 is rotated, and the screw shaft 110 connected to the driven gear 115 is also rotated together with the driven gear 115.

At this time, the rotary force firstly increased by the planetary gear device 150 is secondarily increased at a gear ratio by the driven gear 115.

As the screw shaft 110 is rotated, the nuts 130 provided at both sides of the screw shaft 110 are moved in directions of becoming distant from each other. In this case, since the webs 25 and 35, to which the nuts 130 are fixed, are moved together with the nuts 130, braking of the drum 10 is performed by applying pressure to the two brake shoes 20 and 30.

Further, the secondarily increased rotary force of the driving motor 120 is thirdly increased at a gear ratio of the screw shaft 110 and the nuts 130.

Therefore, since the rotary force generated from the driving motor 120 is increased in three stages, the size of the driving motor 120 may be reduced and thus space efficiency may be improved.

On the other hand, in case that the braking of the drum 10 is released, the nuts 130 are moved in directions of becoming close to each other by the reverse rotation of the driving motor 130, and thus the pressure applied to the two brake shoes 20 and 30 is released.

Figure 4:
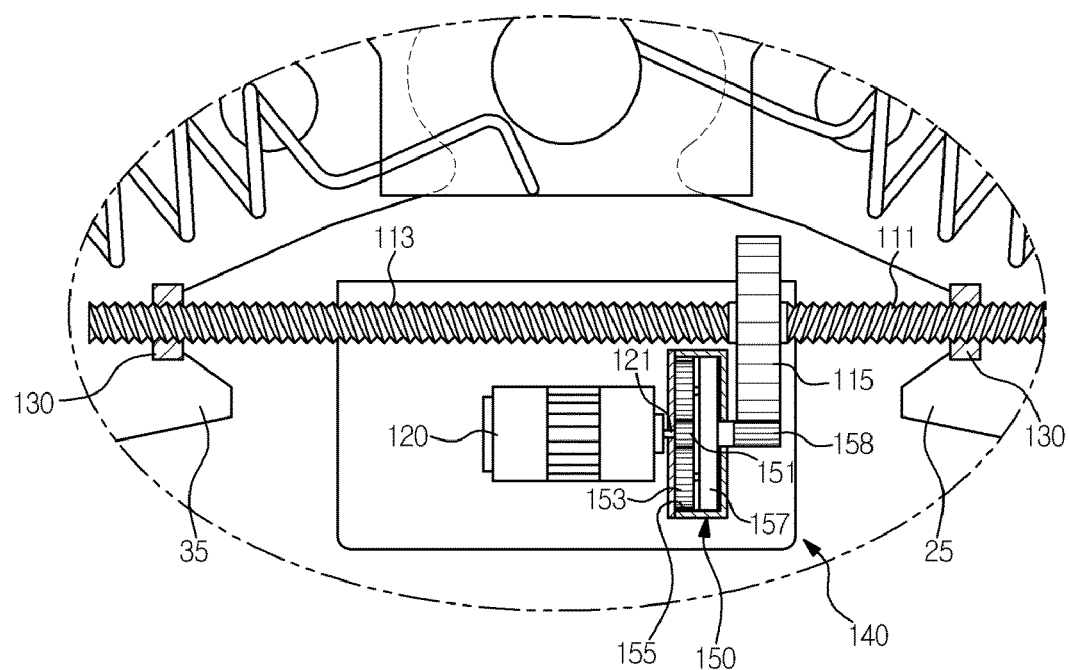
FIG. 4 is a cross-sectional view of an actuator of an electronic mechanical drum brake in accordance with a further embodiment of the present invention.
Figure 5:
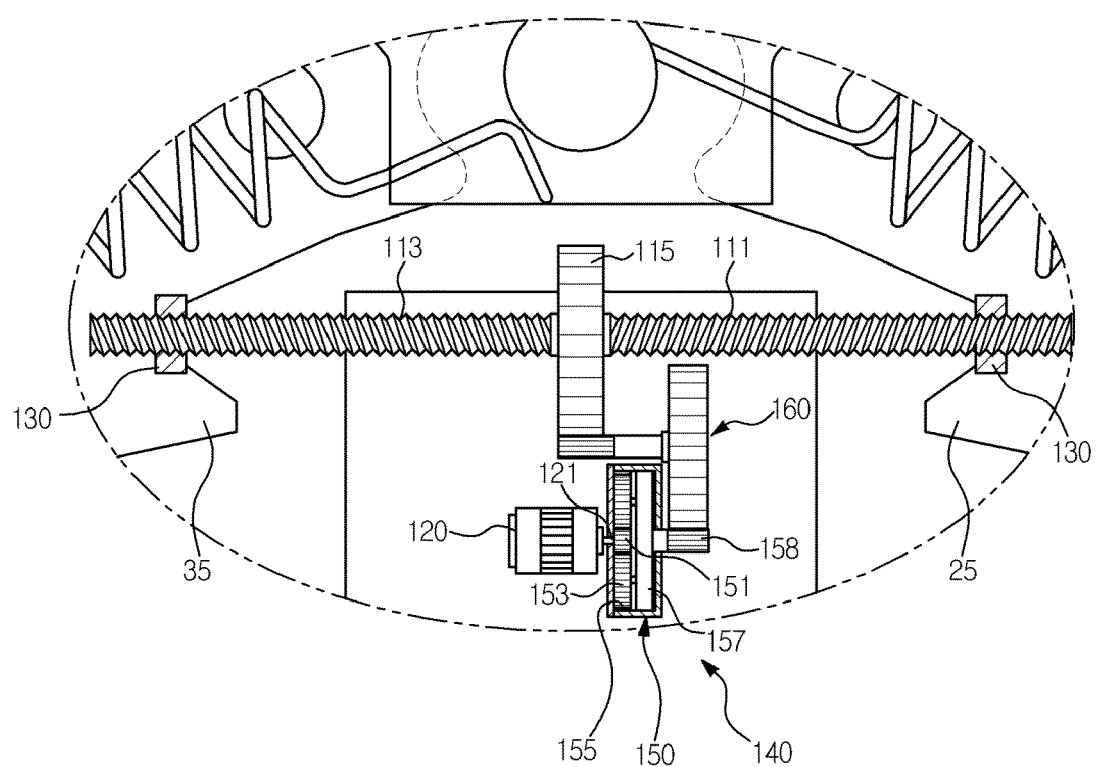
FIG. 5 is a cross-sectional view of an actuator of an electronic mechanical drum brake in accordance with another embodiment of the present invention.

FIGS. 4 and 5 illustrate actuators of electronic mechanical drum brakes in accordance with other embodiments of the present invention.

As shown in FIG. 4, a driven gear 115 connected integrally with a screw shaft 110 is one-sided on the screw shaft 110 so as to be adjacent to one nut 130 of the screw shaft 110. Through this configuration, the size of a driving motor 120 disposed in a limited space may be increased and thus braking power may be further increased.

Further, as shown in FIG. 5, a connection gear unit 160 to transmit rotary force of a driving motor 120, firstly increased by a planetary gear device 150, to a driven gear 115 rotated together with a screw shaft 110 and to increase the rotary force, simultaneously is installed between a driving gear 158 and the driven gear 115.

The connection gear unit 160 may use various gears, such as a spur gear, a worm gear, and a bevel gear, according to positions of a shaft so as to transmit rotary force of the driving gear 158 to the driven gear 115.

As is apparent from the above description, an electronic mechanical drum brake in accordance with one embodiment of the present invention obtains a greater braking power even using one motor, and improves efficiency of a mounted space.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic mechanical drum brake comprising a drum rotated together with a wheel, a pair of brake shoes respectively including rims provided with linings, which rub against the inner circumferential surface of the drum and generate braking power, attached thereto and webs provided on the inner circumferential surfaces of the rims to reinforce rigidity of the rims, and an actuator provided between the webs of the pair of brake shoes, wherein:

the actuator includes a screw shaft provided with a driven gear formed integrally therewith and a left-handed thread at one side thereof and a right-handed thread at the other side thereof, a driving motor to rotate the screw shaft in a regular direction and its reverse direction, a booster unit to increase rotary force of the driving motor and then to transmit the increased rotary force to the driven gear, and nuts screw-connected to both ends of the screw shaft and fixed to the webs;

the nuts rectilinearly move along the screw shaft in opposite directions according to rotation of the driving motor, and thus cause the webs connected with the nuts to apply pressure to the pair of brake shoes or release the pressure from the pair of brake shoes so as to perform braking; and the booster unit is a planetary gear device to increase the rotary force of the driving motor and then to transmit the increased rotary force to the driven gear.

2. The electronic mechanical drum brake according to claim 1, wherein the planetary gear device includes a sun gear connected to a rotary shaft of the driving motor, a plurality of planetary gears contacting the outer surface of the sun gear, a ring gear, the inner surface of which contacts the plurality of planetary gears, a carrier connecting the plurality of planetary gears, and a driving gear connected integrally with the carrier.

3. The electronic mechanical drum brake according to claim 1, wherein a connection gear unit to increase rotary force of the driving gear is provided between the planetary gear device and the driven gear.

4. The electronic mechanical drum brake according to claim 1, wherein the driven gear is one-sided on the screw shaft.

5. The electronic mechanical drum brake according to claim 2, wherein a connection gear unit to increase rotary force of the driving gear is provided between the planetary gear device and the driven gear.

6. The electronic mechanical drum brake according to claim 1, wherein the driven gear is one-sided on the screw shaft.

7. The electronic mechanical drum brake according to claim 2, wherein the driven gear is one-sided on the screw shaft.

8. The electronic mechanical drum brake according to claim 2, wherein a connection gear unit to increase rotary force of the driving gear is provided between the planetary gear device and the driven gear.

9. The electronic mechanical drum brake according to claim 2, wherein the driven gear is one-sided on the screw shaft.

* * * * *